Feb. 28, 1950      J. J. JACOBSON      2,499,066
SELF-LOCKING ADJUSTABLE TRIPOD HEAD
Filed Feb. 25, 1948
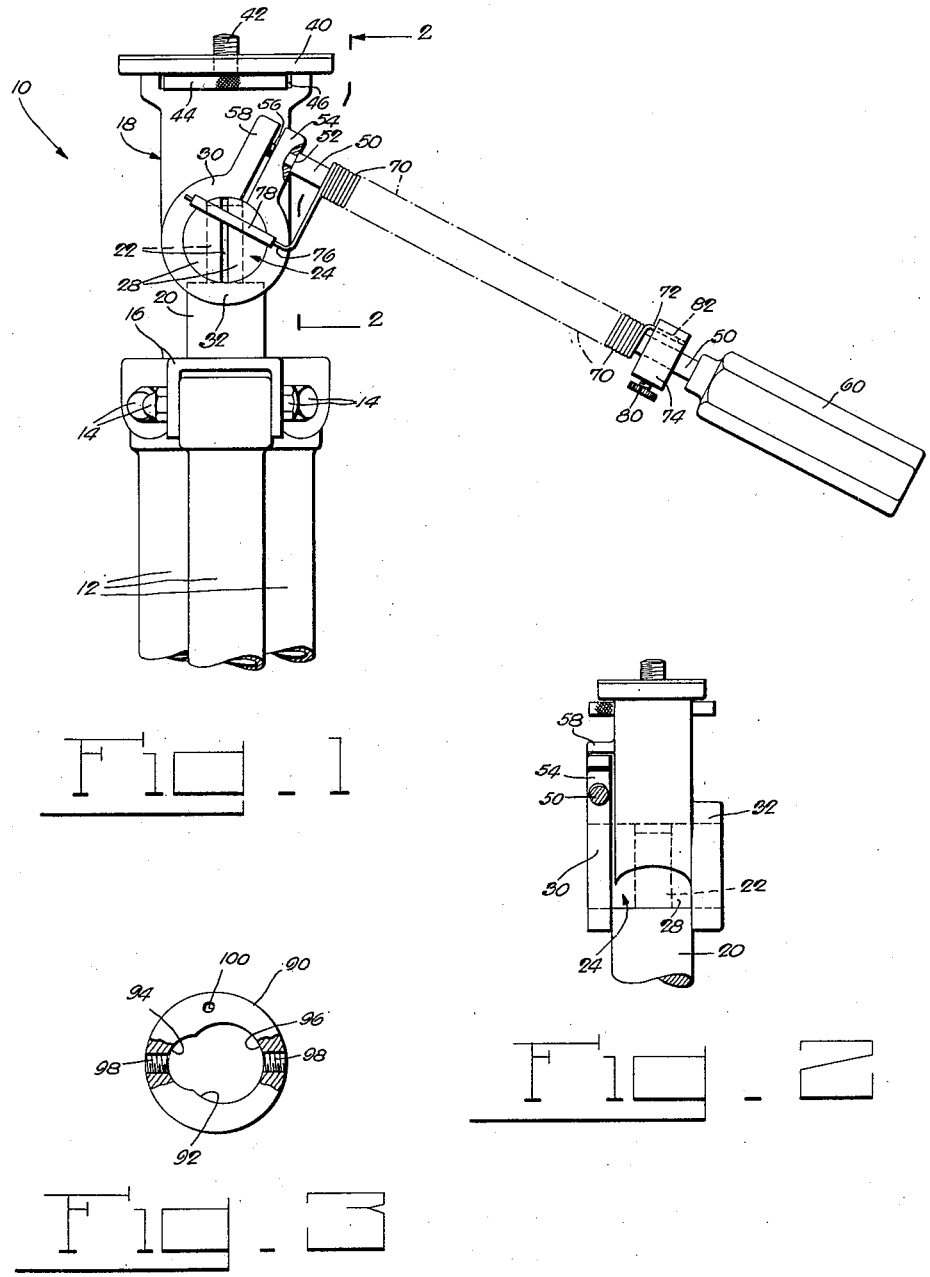
INVENTOR
JAMES J. JACOBSON
BY Edwin Levinohn
ATTORNEY Patented Feb. 28, 1950

2,499,066

UNITED STATES PATENT OFFICE 2,499,066

SELF-LOCKING ADJUSTABLE TRIPOD HEAD

James J. Jacobson, New York, N. Y.

Application February 25, 1948, Serial No. 10,683

5 Claims. (Cl. 248—178)

1

This invention relates to tripods for cameras and other instrumentalities, and more particularly to the adjustable mounting heads thereof.

The mounting heads of certain tripods are universally adjustable by means of a well-known clamp arrangement which requires a single turnable handle with which to release and lock the latter, as well as move the mounting head into any adjusted position.

It is the primary object of the present invention to make provisions on the clamp arrangement of a tripod for yieldingly retaining the operating handle therefor in the position in which the tripod head is locked against adjustment, so that the latter is automatically locked after adjustment on the mere release of the operating handle of the operator.

The above and other objects, features and advantages of the present invention will be more fully understood from the following description considered in connection with the accompanying illustrative drawings.

In the drawings:

Fig. 1 is a fragmentary elevational view of a tripod embodying the present invention;

Fig. 2 is a fragmentary section taken substantionally on the line 2—2 of Fig. 1; and Fig. 3 is a plan view, partly in section of a detail of the tripod.

Referring to the drawings, and especially to Fig. 1 thereof, the reference numeral 10 designates a tripod having the usual legs 12 that may telescope and are pivoted at 14 on a bracket 16 on which the head 18 of the tripod is conventionally mounted for universal adjustment. Thus, the bracket 16 is provided with a post 20 having a shank 22 that extends through a cross-pin 24 on which the head 18 is journalled. The cross-pin 24, being turnable on the shank 22, imparts its rotation to the head 18, and the latter is additionally turnable on the cross-pin 24, thus affording universal adjustment of the head 18. The cross-pin 24 is made of two complementary sections 28, while a portion of the journal 32 of the head 18 is made in the form of a split clamp 30. Thus, when the clamp 30 of the head 18 is tightened, the latter is clamped to the cross-pin 24, and the sections 28 of the cross-pin are simultaneously clamped to the shank 22, as will be readily understood. Conversely, when the clamp 30 of the head 18 is released from clamping engagement with the cross-pin 24, the sections 28 of the latter are also released from clamping engagement with the shank 22, and the head 18 may then be adjusted into any desired position. The head 18 is

2 customarily provided with a platform 40 on which a camera or other instrument may be mounted, there being usually provided for this purpose a mounting screw 42 that projects upwardly through the platform 40 and is manipulated by a wheel 44 in an aperture 46 in the head.

Opening and closing of the clamp 30 of the head 18 is accomplished by a rod 50 having a shoulder 52 that bears against the adjacent arm 54 of the clamp 30, and a shank 56 which is threadedly received by the other arm 58 of the clamp 30. The rod 50 is provided with a convenient handle 60 with which to turn the latter for opening and closing the clamp 30 of the head 18 as well as to move the head 18 into any adjusted position. Thus, turning of the rod 50 in unthreading direction will permit the clamp 30 of the head 18 to open, whereupon the latter may be moved to any adjusted position. Conversely, turning of the rod 50 in threading direction will close the clamp 30 and thereby lock the head 18 in any adjusted position.

The tripod described so far is entirely conventional, and the novel subject matter will now be described. Surrounding the rod 50 is a pre-wound torsion spring 70, having one end 72 anchored on a collar 74 on the rod 50, and having its other end 76 offset in the fashion shown in Fig. 1 and bearing against the head 18. Preferably, a rubber sleeve 78 is passed over the spring end 76 to serve as a cushioning pad between the latter and the head 18. Spring 70 is so applied that it normally turns the rod 50 in threading direction to effect closing of the clamp 30. The collar 74 may slidably fit on the rod 50 and be secured to the latter by a set screw 80. The spring end 72 may be anchored on the collar 74 by being extended into a hole 82 in the latter.

Thus, in order to adjust the position of the head 18, it is merely necessary for an operator slightly to turn rod 50 at the handle 60 in unthreading direction and then move the head into the desired position. As soon as the head 18 is in the desired position, the operator merely releases the handle 60, whereupon the spring 70 performs its designated function of locking the head 18 in position, as previously described.

The described spring-return of the rod 50 into clamp-closing position requires only two inexpensive parts 70 and 74 that may readily be mounted on any tripod, subject only to providing springs 70 and collars 74 of different sizes to accommodate rods 50 of different dimensions. The rods 50 are customarily cylindrical and come on tripods in a few more or less standardized diameters so that only a few different sizes of springs will be required to accommodate rods of all sizes.

In order to accommodate the collar to rods of all or most different diameters, reference is now had to Fig. 3 in which a universal collar 90 is shown. This collar is provided with a through-aperture 92 the wall of which fits a plurality, in the present instance two, overlapping discs of different diameters. Thus, a part 94 of the aperture wall is circular to fit a rod 50 of minimum diameter, while another part 96 of the aperture wall is circular to fit a rod 50 of maximum diameter. Collar 90 is also provided with a plurality of tapped holes 98 of which either one may receive a set screw, and a hole 100 that may serve for the anchorage of the adjacent end of the spring 70 with which the collar is used. To fit collar 90 to a rod 50 of any diameter intermediate minimum and maximum, the rod is brought into engagement with that wall portion 94 and 96 which most nearly approximates the peripheral curvature of the rod, whereupon a set screw is tightened in the appropriate tapped hole 98 in the collar in order to secure the latter to the rod.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent, is:

1. In a tripod having a mounting head, an adjustable mounting for said head including a clamp for releasably locking said mounting in adjusted position, and a handle threadedly received by said clamp for opening and closing the latter on turning said handle in opposite directions, respectively, yielding means interposed between said mounting and handle and normally urging the latter in clamp-closing direction.

2. On a tripod having a mounting head, an adjustable mounting for said head including a clamp for releasably locking said mounting in adjusted position, and a handle threadedly received by said clamp for opening and closing the latter on turning said handle in unthreading and threading directions, respectively, a pre-wound torsion spring surrounding said handle and being anchored on the latter with one end and on said mounting with the other end, said spring normally urging the handle in said threading direction.

3. On a tripod having a mounting head, an adjustable mounting for said head, and a cylindrical handle threadedly received by said mounting and adapted to release said mounting for, and lock it against, adjustment on turning said handle in unthreading and threading directions, respectively, a collar having an aperture the wall of which fits overlapping round discs of different diameters, and angularly spaced tapped holes in its periphery leading to said aperture, said collar being received on said handle with the latter in engagement with that wall portion of the aperture that most nearly approximates the cross-sectional curvature of said handle, a set screw in one of said tapped holes for firmly mounting said collar on said handle, and a pre-wound torsion spring surrounding said handle and being removably anchored with one end on said collar and with the other end on said mounting, said spring normally urging the handle in said threading direction.

4. A spring-return for turning the threadedly mounted cylindrical handle on the adjustable mounting of the head of a tripod in threading direction in order to lock said mounting against adjustment, comprising a collar for mounting on the handle, said collar having an aperture the wall of which fits overlapping round discs of different diameters so as to permit engagement with the handle of that wall portion most nearly approximating the cross-sectional curvature of the handle, angularly spaced tapped holes in the periphery of said collar and leading to said aperture and an anchor hole in the latter, a set screw in one of said tapped holes, and a torsion spring of a size to be passable over the handle and having bent-off ends of which one end is receivable in said anchor hole.

5. An end mounting for a return spring adapted to turn the threadedly mounted cylindrical handle on the adjustable mounting of the head of a tripod in threading direction in order to lock said mounting against adjustment, comprising a collar for mounting on the handle, said collar having provisions for the anchorage of one end of the spring, an aperture the wall of which fits overlapping round discs of different diameters so as to permit engagement with the handle of that wall portion most nearly approximating the cross-sectional curvature of the handle, and angularly spaced tapped holes in the periphery of said collar and leading to said aperture, said tapped holes being adapted for the reception of a set screw.

JAMES J. JACOBSON.

REFERENCES CITED

The following references are of record in the file of this patent:

UNITED STATES PATENTS

| Number | Name | Date |
|---|---|---|
| 870,142 | Wahlstrom | Nov. 5, 1907 |
| 1,272,574 | Thomas | July 16, 1918 |
| 1,962,548 | Zerk | June 12, 1934 |
| 2,188,514 | Moore | Jan. 30, 1940 |